US009305001B2

(12) United States Patent
Barron et al.

(10) Patent No.: US 9,305,001 B2
(45) Date of Patent: Apr. 5, 2016

(54) CLUSTER VIEW FOR STORAGE DEVICES

(71) Applicant: NetApp Inc., Sunnyvale, CA (US)

(72) Inventors: Edward Barron, Pepperell, MA (US); Loellyn Cassell, Pleasanton, CA (US); John DeGraaf, Cranberry Township, PA (US)

(73) Assignee: NetApp Inc., Sunnyvale, CA (US)

( * ) Notice: Subject to any disclaimer, the term of this patent is extended or adjusted under 35 U.S.C. 154(b) by 122 days.

(21) Appl. No.: 14/222,274

(22) Filed: Mar. 21, 2014

(65) Prior Publication Data

US 2014/0207760 A1    Jul. 24, 2014

Related U.S. Application Data

(63) Continuation of application No. 13/237,369, filed on Sep. 20, 2011, now Pat. No. 8,700,875.

(51) Int. Cl.
*G06F 17/30* (2006.01)
*G06F 3/06* (2006.01)
*H04L 12/26* (2006.01)
*H04L 12/24* (2006.01)

(52) U.S. Cl.
CPC ........ *G06F 17/30112* (2013.01); *G06F 3/0605* (2013.01); *G06F 3/067* (2013.01); *G06F 3/0653* (2013.01); *G06F 17/302* (2013.01); *H04L 41/0893* (2013.01); *H04L 43/0817* (2013.01); *G06F 2206/1008* (2013.01); *H04L 41/069* (2013.01); *H04L 41/0853* (2013.01); *H04L 41/12* (2013.01)

(58) Field of Classification Search
CPC ............ G06F 17/30112; G06F 17/302; G06F 11/3051; G06F 3/0605; G06F 3/0653; G06F 3/067
See application file for complete search history.

(56) References Cited

U.S. PATENT DOCUMENTS

| | | | |
|---|---|---|---|
| 8,700,875 B1 * | 4/2014 | Barron | G06F 3/0605 711/170 |
| 2004/0073747 A1 | 4/2004 | Lu | |
| 2007/0094378 A1 * | 4/2007 | Baldwin | G06F 3/0601 709/223 |
| 2008/0115008 A1 | 5/2008 | Daftardar | |
| 2010/0214940 A1 * | 8/2010 | Macauley | H04L 41/0806 370/252 |

* cited by examiner

*Primary Examiner* — Edward Dudek, Jr.
(74) *Attorney, Agent, or Firm* — Cooper Legal Group, LLC

(57) ABSTRACT

One or more techniques and/or systems are provided for generating a macroscopic cluster view of storage devices, as opposed to merely an isolated view from an individual node. For example, nodes within a node cluster may be queried for storage device reports comprising storage device information regarding storage devices with which the nodes are respectively connected (e.g., I/O performance statistics, path connections, storage device attributes, status, error history, etc.). The storage device reports may be aggregated together to define one or more storage device data structures (e.g., a storage device data structure comprising one or more tables that may be populated with storage device information). In this way, the cluster view may be generated based upon querying one or more storage device data structures (e.g., an error cluster view, a storage device cluster view, a node summary cluster view, etc.).

20 Claims, 11 Drawing Sheets

CLUSTER VIEW FOR STORAGE DEVICES

RELATED APPLICATIONS

This application is a continuation of U.S. application Ser. No. 13/237,369, filed on Sep. 20, 2011, entitled "CLUSTER VIEW FOR STORAGE DEVICES", at least some of which may be incorporated herein.

FIELD

The instant disclosure pertains to generating a cluster view of storage devices from an aggregated viewpoint of a node cluster.

BACKGROUND

A network storage environment may comprise a node cluster (e.g., storage servers) of nodes that collaborate together to manage various aspects of data storage associated with attached storage devices (e.g., data volume creation, read/write access, logical unit number (LUN) creation, virtual and physical data formatting, etc.). For example, the node cluster may provide host computing devices with read/write access to data stored on storage devices. In this way, a host computing device may connect to a node that may provide the host computing device with access to data stored on storage devices connected to the node. In one example, a node cluster may comprise node A, node B, node C, and/or other nodes. Node A may be connected to storage device 1 and storage device 2, node B may be connected to storage device 3, node C may be connected to storage device 2 and storage device 5, etc. A user may desire to startup a virtual machine on a desktop host computing device using a virtual machine hosting application. The virtual machine hosting application may be configured to retrieve virtual machine data of the virtual machine from storage devices accessible through the node cluster. In particular, the virtual machine hosting application may access node C because node C is connected to storage device 2 and storage device 5, which may store the virtual machine data. In this way, node C may provide the virtual machine hosting application on the desktop host computing device with access to the virtual machine data stored across storage device 2 and storage device 5.

Conventional network storage environments may provide reporting tools that generate views of storage information from isolated viewpoints of individual nodes within the node cluster (e.g., storage information known to node A, storage information known to node B, etc.). Unfortunately, such conventional reporting techniques merely provide views that are based upon isolated reports from the respective nodes. For example, an administrator of a node cluster may request a view of storage devices attached to the node cluster. Accordingly, the nodes may be individually queried to determine what storages devices are accessible to the respective nodes. In this way, the administrator may be presented with a view of information derived from isolated reports of storage information that is known to the nodes individually. For example, the view may specify that node D reported information regarding storage device 3, node E reported information regarding storage device 3 and 5, node F reported information regarding storage device 6, node G reported information regarding storage device 3 and 5, etc. Because the reports from the nodes are isolated, the view may comprise a significant amount of redundant and/or overlapping information (e.g., information regarding device 3 may have been reported three times by node D, node E, and node G). Thus, the administrator may not be provided with an efficient or adequate view of what the node cluster knows as a single cluster unit operating together, but merely with what individual nodes reported.

SUMMARY

The disclosure relates to one or more techniques and/or systems that generate a cluster view of one or more storage devices. That is, a cluster view may be generated that provides a view of storage device information from an aggregated viewpoint of a node cluster operating together, as opposed to from a viewpoint based upon isolate reports from individual nodes (e.g., what storage devices the node cluster sees, as opposed to what storage devices the individuals nodes see). In particular, storage device reports comprising storage device information reported from nodes within a node cluster may be aggregated together into storage device data structures for respective storage devices (e.g., individualized storage device data structure per storage device). In this way, a cluster view may be generated utilizing one or more storage device data structures.

In one example, respective nodes within a node cluster may be queried for storage device reports. In particular, a node may be queried for a storage device report associated with one or more storage devices connected to the node (e.g., a storage application programming interface (API) on the node may be queried). The storage device report may comprise storage device information reported back by one or more storage subsystems associated with the storage API (e.g., a device driver may be configured to provide a device status, such as an ability to accept I/O requests; a first subsystem may be configured to query a storage device for storage device attribute information, such as model, vendor, path connections from the storage device to one or more nodes, etc.; a second subsystem may be configured to determine I/O performance statistics, such as read/write rates, latency, errors, etc.; and/or other subsystems). In this way, the storage device report may comprise storage device information specifying a list of path connections from the storage device to one or more nodes and/or storage device configuration and statistical information (e.g., I/O performance statistics, storage device attribute information, storage device ownership, error history, etc.). It may be appreciated that one example of one or more storage device reports is shown and further described in FIG. 6.

The storage device reports may be aggregated together to define storage device data structures for the storage devices (e.g., storage device information reported by various nodes may be correlated together to create an individualized storage device data structure for respective storage devices). For example, a storage device specified within a storage device report may be identified (e.g., node A may report storage device information associated with storage device 1). A storage device data structure for the storage device may be defined based upon storage device information within the storage device report (e.g., a new storage device data structure may be created or an existing storage device data structure may be updated). It may be appreciated that one example of a storage device data structure is shown and further described in FIG. 7. For example, supplemental information may be added into the storage device data structure, non-supplemental redundant information may be discarded, and/or conflicting information may be discarded or used to overwrite current information based upon the role of the node reporting such information (e.g., information from an ownership node may be preferred over information from a non-ownership node). In this way, storage device data structures may be defined for the respective storage devices based upon aggregating the storage device information within the storage device reports. It may be appreciated that in one example, a single storage device data structure may comprise a complete view of a storage device from an aggregate viewpoint of the node cluster.

It may be appreciated that aggregating storage device reports to define storage device data structures for storage devices allows for the generation of cluster views that provide an aggregated viewpoint of the node cluster. Without the storage device data structures, information about storage devices and/or the storage cluster may be limited to isolated viewpoints of storage devices from individual nodes. That is, various cluster views may be generated utilizing one or more storage device data structures. Such views may provide storage device information based upon an aggregate viewpoint of the node cluster operating together, rather than isolated viewpoints from individual nodes. A cluster view may be generated based upon information within one or more storage device data structures. For example, a query may be constructed, and executed against one or more storage device data structures to create a cluster view (e.g., "find storage devices where RPM>7200 and error count=0 and status=active"). In this way, a plethora of different queries may be constructed to generate different cluster views. It may be appreciated that a query may be based upon various (e.g., predefined) rules and/or query terms that may be constructed together, which may improve precision of storage device data fetching (e.g., redundant data may be excluded based upon the query terms and/or rules of a query).

In one example, an error cluster view may be generated by querying one or more storage device data structures to identify storage devices associated with at least one error from the viewpoint of the node cluster. It may be appreciated that one example of an error cluster view is shown and further described in FIG. 9. In another example, a node summary cluster view may be generated by querying one or more storage device data structures to provide a comprehensive cluster view of storage devices and storage device connectivity within the node cluster (e.g., the node summary cluster view may illustrate from the perspective of the node cluster that storage device 1 is connected to node A, storage device 2 is connected to node B and node C, storage device 3 is connected to node B, etc.). It may be appreciated that one example of a node summary cluster view is shown and further described in FIG. 8. In another example, a storage device cluster view of a storage device may be generated by querying a storage device data structure associated with the storage device. The storage device cluster view may comprise path connections from the storage device to one or more nodes, storage device configuration and statistical information, error history, and/or other storage device information. It may be appreciated that one example of a storage device cluster view is shown and further described in FIG. 10. In this way, various cluster views may be generated utilizing the storage device data structures, which may provide a comprehensive view of storage from the viewpoint of the node cluster, rather than isolated views of what nodes individually see.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
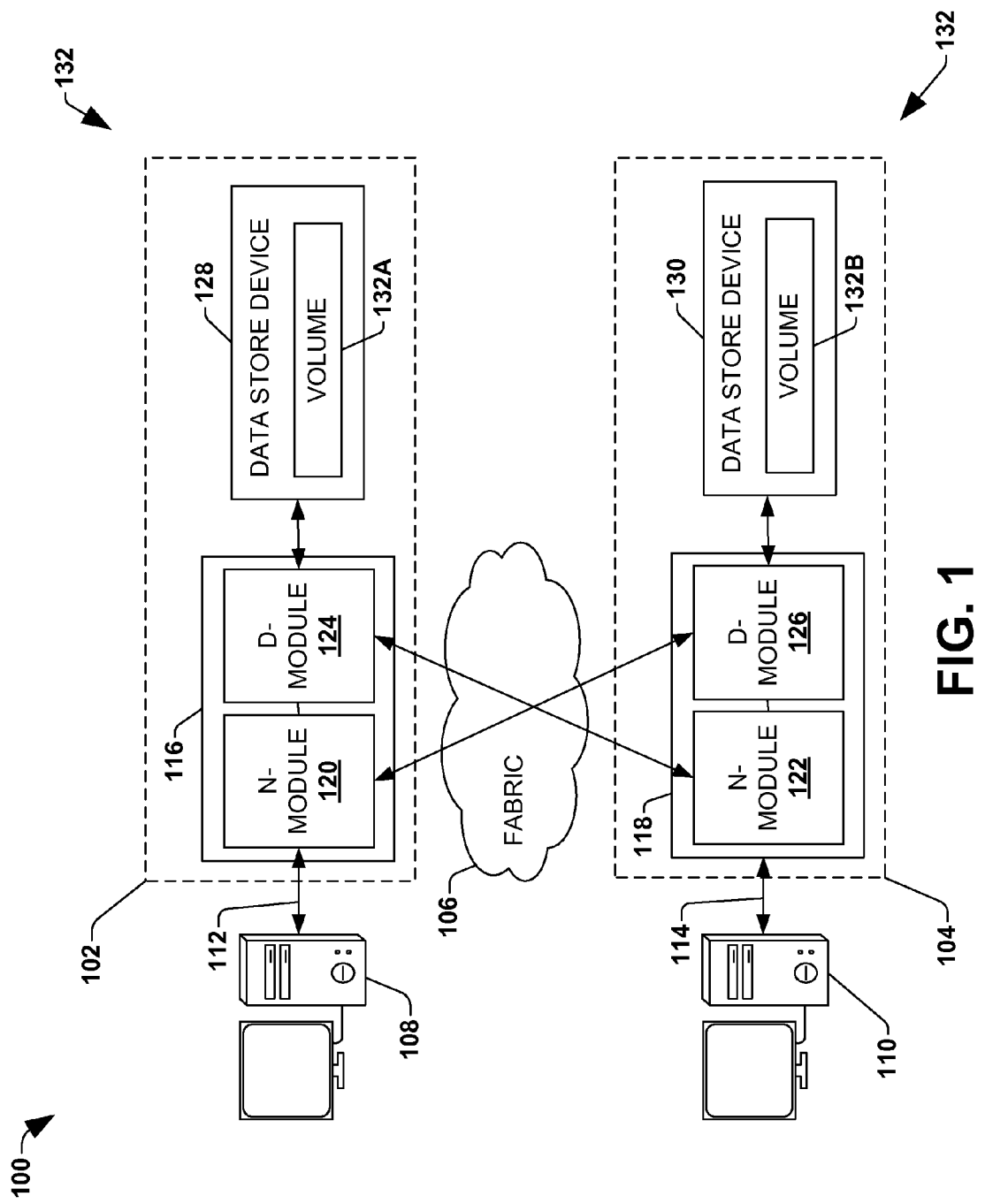
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. Nothing in this detailed description is admitted as prior art.

As nodes (e.g., storage servers) within a node cluster (e.g., a network storage environment) become increasingly interconnected and operate together as a self-aware cluster, it may be advantageous to provide comprehensive cluster views of storage information from a viewpoint of the node cluster, as opposed to from a viewpoint based upon isolated reports from individual nodes. Unfortunately, current reporting tools may provide views of storage information from the viewpoint of individual nodes (e.g., information known to a single node without regard to what information another node knows). Such views may provide an inadequate view of storage information (e.g., a significant amount of redundant and/or overlapping data may be reported by nodes and/or presented within a view because information reported by the nodes may not be aggregated together).

Accordingly, a cluster view of one or more storage devices may be generated based upon aggregated storage device reports from nodes within a node cluster as provided herein. In particular, storage device reports may be received from nodes within the node cluster. The storage device reports may comprise storage device information (e.g., a list of path connections from a storage device to one or more nodes and/or storage device configuration and statistical information, such as I/O performance, error history, ownership, storage device status and attributes, etc.). The storage device reports may be aggregated to define storage device data structures for storage devices (e.g., an ordered sequence of storage device data structures associated with corresponding storage devices may be maintained, where a single storage device data structure may comprise a complete view of a storage device from an aggregate viewpoint of the node cluster). In this way, storage device data structures may be utilized to generate a cluster view of storage information from the viewpoint of the node cluster (e.g., a wide variety of queries may be constructed using various rules and/or query terms, which may be executed against one or more storage device data structures to extract information to populate different cluster views). For example, a single API may be used to fetch details about one or more storage devices on a per-storage device basis.

Figure 2:
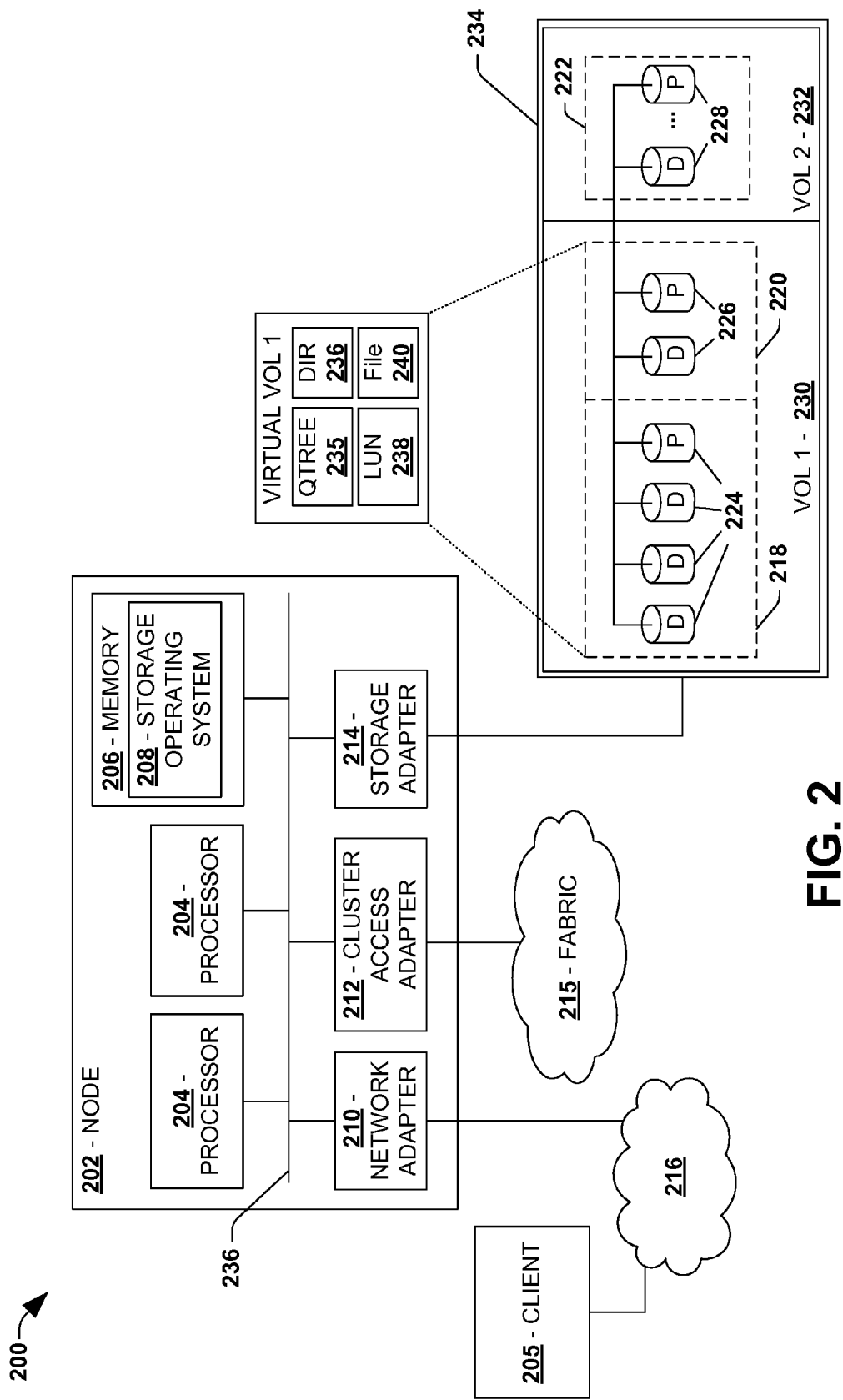
FIG. 2 is a component block diagram illustrating an example data storage system in accordance with one or more of the provisions set forth herein.

To provide context for cluster view generation, FIG. 1 illustrates a clustered network environment 100 (e.g., a node cluster), and FIG. 2 illustrates an embodiment of a data storage system 200 (e.g., comprising a node) that may be implemented to store and manage data within one or more storage devices of which a cluster view may be generated. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems 102 and 104 that are coupled over a cluster fabric 106, such as a computing network embodied as a private Infiniband or Fibre Channel (FC) network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more clients 108, 110 which may comprise, for example, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the clients 108, 110 may be general-purpose computers running applications, and may interact with the data storage systems 102, 104 using a client/server model for exchange of information. That is, the client may request data from the data storage system, and the data storage system may return results of the request to the client via one or more network connections 112, 114.

The nodes 116, 118 on clustered data storage systems 102, 104 can comprise network or host nodes that are interconnected as a cluster to provide data storage and management services, such as to an enterprise having remote locations, for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

As illustrated in the exemplary environment 100, nodes 116, 118 can comprise various functional components that coordinate to provide distributed storage architecture for the cluster. For example, the nodes can comprise a network module 120, 122 (e.g., N-Module, or N-Blade) and a data module 124, 126 (e.g., D-Module, or D-Blade). Network modules 120, 122 can be configured to allow the nodes 116, 118 to connect with clients 108, 110 over the network connections 112, 114, for example, allowing the clients 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of N and D modules, other embodiments may comprise a differing number of these modules. For example, there may be a plurality of N and/or D modules interconnected in a cluster that does not have a one-to-one correspondence between the N and D modules. That is, different nodes can have a different number of N and D modules, and the same node can have a different number of N modules than D modules.

Further, a client 108, 110 can be networked with the nodes 116, 118 in the cluster, over the networking connections 112, 114. As an example, respective clients 108, 110 that are networked to a cluster may request services (e.g., exchanging of information in the form of data packets) of a node 116, 118 in the cluster, and the node 116, 118 can return results of the requested services to the clients 108, 110. In one embodiment, the clients 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the clients 108, 110 can utilize the data storage systems 102, 104 to store and retrieve data from the volumes 132. In this embodiment, for example, the client 108 can send data packets to the N-module 120 in the node 116 within data storage system 102. The node 116 can forward the data to the data storage device 128 using the D-module 124, where the data storage device 128 comprises volume 132A. In this way, in this example, the client can access the storage volume 132A, to store and/or retrieve data, using the data storage system 102 connected by the network connection 112. Further, in this embodiment, the client 110 can exchange data with the N-module 122 in the host 118 within the data storage system 104 (e.g., which may be remote from the data storage system 102). The host 118 can forward the data to the data storage device 130 using the D-module 126, thereby accessing volume 132B associated with the data storage device 130.

It may be appreciated that generation of a cluster view of one or more storage devices may be implemented within clustered network environment 100. For example, a node query component configured to query nodes (e.g., nodes 116, 118), a data structure component configured to define storage device data structures for storage devices (e.g., data store devices 128, 130), and/or a cluster view component configured to generate a cluster view from the viewpoint of the node cluster (e.g., clustered network environment 100) may be implemented within the clustered network environment 100. For example, such components may be implemented within clients 108, 110, nodes 116, 118, and/or other nodes, such as a centralized node, not illustrated.

FIG. 2 is an illustrative example of a data storage system 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A client 205 (e.g., 108, 110 in FIG. 1) can be connected to the node 202 over a network 216, for example, to provides access to files and/or other data stored on the data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 236. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the host 202 can to respond to client requests to manage data on the data storage device 200 (e.g., or additional clustered devices) in accordance with these client requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software program code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a client 205 over a computer network 216, which may comprise, among other things, a point-to-point connection or a shared medium, such as a local area network. The client 205 (e.g., 108, 110 of FIG. 1) may be a general-purpose computer configured to execute applications. As described above, the client 205 may interact with the data storage system 200 in accordance with a client/host model of information delivery.

The storage adapter 214 cooperates with the operating system 208 executing on the host 202 to access information requested by the client 205. The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can includes input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 236 to the network adapter 210 (and/or the cluster access adapter 212 if sending to another node in the cluster) where the information is formatted into a data packet and returned to the client 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, such as data (D) and/or parity (P), whereas the directory may be implemented as a specially formatted file in which other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume, which may also be referred to as a "traditional volume" in some contexts, corresponds to at least a portion of physical memory whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical memory locations, such as some available space from each of the disks 224, 226, 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the host 202 connects to a volume 230, 232 through the storage adapter 214, a connection between the host 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that a cluster view of one or more storage devices may be generated based upon storage device data structures defined using storage device reports from one or more nodes (node 202). For example, a storage device cluster view of data storage device 234 may be generated based upon a storage device data structure for data storage device 234, which may have been defined based upon a storage device report from node 202 and/or other nodes connected to data storage device 234.

Figure 3:
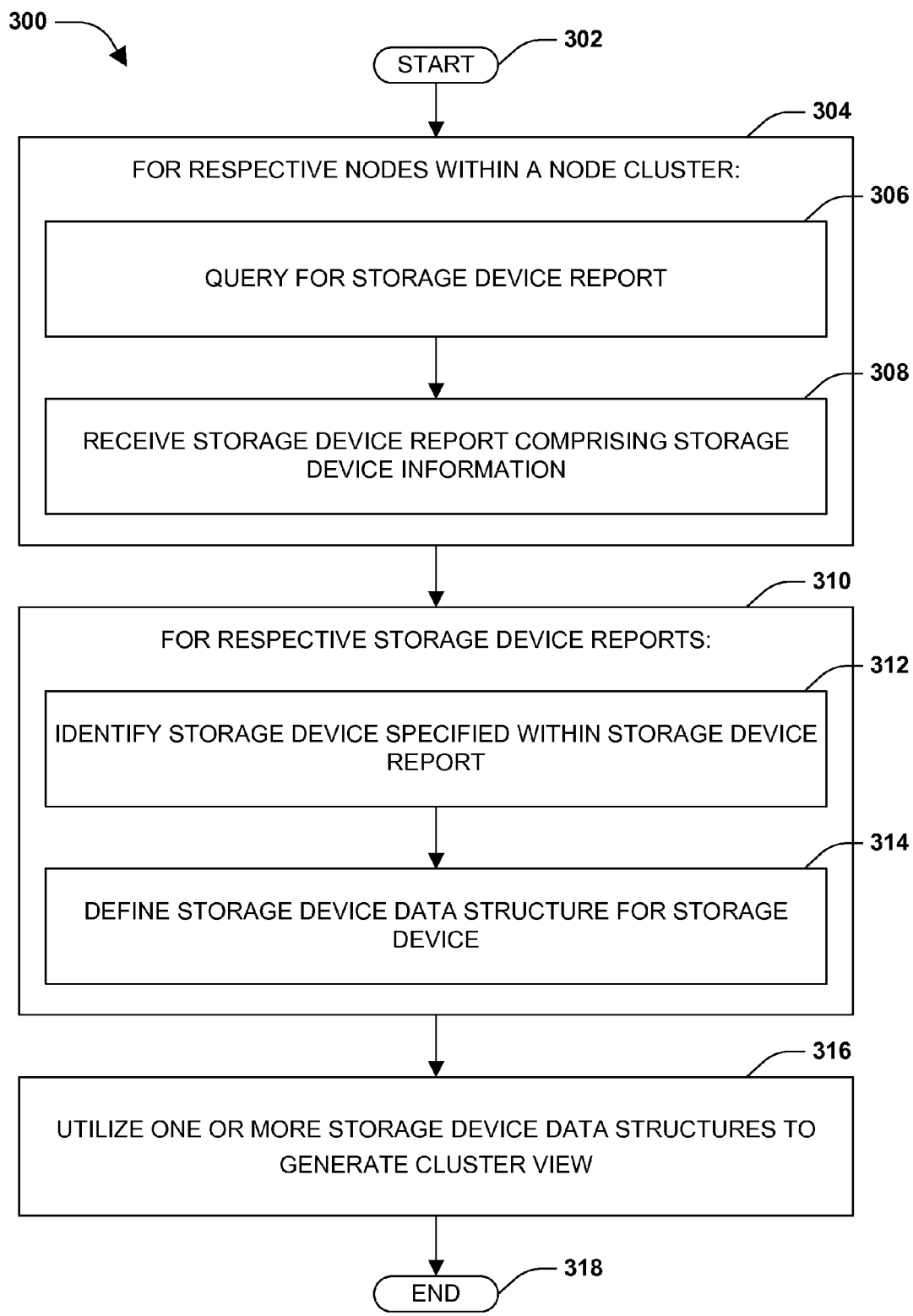
FIG. 3 is a flow chart illustrating an exemplary method of generating a cluster view of one or more storage devices.

One embodiment of generating a cluster view of one or more storage devices is illustrated by exemplary method 300 in FIG. 3. At 302, the method starts. At 304, respective nodes within a node cluster may be queried for storage device reports. In particular, at 306, a node may be queried for a storage device report associated with one or more storage devices connected to the node (e.g., a storage application programming interface (API) on the node may be queried). For example, the storage API may be associated with one or more subsystems and/or device drivers configured to retrieve storage device information that may be populated within the storage device report (e.g., a first subsystem may query a storage device for storage device attribute information, such as model, vendor, path connections from the storage device to one or more nodes, etc.; a second subsystem may determine I/O performance statistics, such as read/write rates, latency, errors, etc.; and/or other subsystems may gather other storage device information).

At 308, the storage device report comprising storage device information may be received from the node. It may be appreciated that one example of one or more storage device reports is shown and further described in FIG. 6. In one example, the storage device information may comprise a list of connections from a storage device to one or more nodes and/or storage device configuration and statistical information associated with one or more storage devices connected to the node. For example, storage device configuration and statistical information may comprise I/O performance statistics (e.g., read/write operations, read/write rates, blocks read/written, latency, time powered on, I/O errors, etc.), storage device status information (e.g., ability and readiness to accept I/O request), storage device role information (e.g., hot replacement spare, offline, online, part of a RAID, etc.), storage device ownership information (e.g., whether a node is an owner or not of a storage device), storage device attribute information (e.g., vendor, model, serial number, RPM, disk type, firmware version, etc.), error history, and/or a variety of other information. It may be appreciated that in one example, the storage APIs of respective nodes within the node cluster may be queried in parallel. In this way, one or more storage device reports may be received substantially concurrently from nodes within the node cluster.

At 310, respective storage device reports may be aggregated to define one or more storage device data structures for storage devices. It may be appreciated that one example of one or more storage device data structures is shown and further described in FIG. 7. In particular, at 312, a storage device specified within a storage device report may be identified. At 314, a storage device data structure for the storage device may be defined for the storage device based upon storage device information within the storage device report. In one example, if the storage device data structure does not exist, then the storage device data structure may be created and/or populated with storage device information from the storage device report.

In another example where the storage device data structure exists, supplemental information within the storage device report may be added into the storage device data structure (e.g., current information within the storage device data structure may specify that storage device 2 is connected to node A, while supplemental information within the storage device report may specify that storage device 2 is connected to node C, and thus the connection to node C may be added into the storage device data structure). In another example, where the storage device data structure exists, non-supplementary redundant information may be discarded (e.g., current information within the storage device data structure may specify that storage device 2 has a model number 123456, while non-supplementary redundant information within the storage device report may specify that storage device 2 has a model number 123456, and thus may be discarded to avoid redundant data).

In another example where the storage device data structure exists, if a preferred node (e.g., a node having ownership over the storage device) reported conflicting information within the storage device report, then the conflicting information may overwrite current information within the storage device data structure (e.g., current information within a storage device data structure for storage device (5) reported by node Z, a spare node for storage device (5), may specify that no I/O operations have been performed recently, while conflicting information within the storage device report reported by node C, an ownership node of storage device (5), may specify that 120 I/O operations have been performed recently, and thus the current information of no I/O operations reported by spare node Z may be replaced in the data structure with the conflicting information of 120 I/O operations because node C, the ownership node, may be performing I/O operations whereas node Z, a spare node, may be in an inactive state). Otherwise, if the node that reported the current information within the storage device data structure is preferred, then the (subsequent) conflicting information may be discarded (e.g., information from node C may not overwrite information from node Z where node Z is preferred over node C).

The storage device data structure may comprise I/O performance statistics for the storage device (e.g., latency, read/write operations, etc.), path connections between the storage device and one or more nodes, storage device status information (e.g., availability to accept I/O request), storage device role information (e.g., active, hot spare, inactive, etc.), storage device attribute information (e.g., model, vendor, etc.), storage device usage statistics (e.g., rated life used, spare sectors consumed, power-on hours), mutable device configurations settings (e.g., checksum type), administrator assigned attributes (e.g., assigned disk name), job status of operations (e.g., media scrub, disk zeroing, reconstruct, and copy operations), storage device ownership (e.g., an ownership node having ownership over the storage device), error history of the storage device, and/or a variety of other information. For example, the storage device data structure may comprise one or more tables, which may be populated with such information (e.g., an attribute info table, an ownership table, a status table, a performance statistics table, a raid table, one or more connection tables, and/or other tables). In this way, the storage device reports may be aggregated to define storage device data structures for storage devices (e.g., a single storage device data structure may be defined for a storage device, which may comprise data aggregated from one or more storage device reports reported from various nodes within the node cluster connected to the storage device).

It may be appreciated that storage device reports may be aggregated regardless of whether storage devices are configured with different data formats and/or whether nodes comprise different operating systems. In one example, the one or more storage devices within the node cluster may correspond to one or more logical unit numbers (LUNs). In another example, a storage device report may comprise storage device information associated with a first storage device comprising a first data format (e.g., a LUN) and a second storage device comprising a second data format (e.g., a physical storage format) different than the first data format. In another example, a first storage device report may be received from a first node comprising a first operating system type, and a second storage device report may be received from a second node comprising a second operating system type different from the first operating system type.

At 316, a cluster view may be generated utilizing one or more storage device data structures. It may be appreciated that one or more examples of cluster views are shown and further described in FIGS. 8-10. In one example, a query may be constructed (e.g., the query may be built with one or more query terms based upon one or more query rules), and execute against one or more storage device data structures to retrieve storage device information to populate a cluster view. In another example, pre-defined queries may be provided for administrative ease (e.g., an administrator may be provided with pre-defined queries that may be executed to generate various cluster views, such as an error cluster view, a storage device summary cluster view, etc.). It may be appreciated that a plethora of queries may be constructed so that various cluster views may be created (e.g., queries may be constructed using syntax similar to relational database queries).

In one example of a cluster view, a request for the node summary cluster view may be received (e.g., an administrator of the node cluster may utilize a command prompt and/or a storage administration utility application to request the cluster view). A node summary query may be constructed, and executed against one or more storage device data structures to create the node summary cluster view comprising a cluster view of storage devices and storage device connectivity within the node cluster (e.g., the node summary query may retrieve storage device information associated with storage devices having an RPM>7200, errors=0, and status=active to create the node summary cluster view). In another example of a cluster view, a request for an error cluster view may be received. An error query may be constructed, and executed against one or more storage device data structures to identify one or more storage devices associated with at least one error to create the error cluster view. In another example of a cluster view, a request for the storage device cluster view of a storage device may be received. A storage device query may be constructed, and executed against one or more storage device data structures to create a storage device cluster view comprising path connections from the storage device to one or more nodes, storage device configuration and statistical information, error history, and/or other information associated with the storage device. In another example, pre-configured commands (e.g., pre-programmed command line commands) and/or pre-defined orderings of output records (e.g., a sorted order in which records within a cluster view may be presented) may be provided for administrative convenience (e.g., a pre-configured command may allow an administrator to quickly retrieve a cluster view of defective storage devices that may be ordered/sorted based upon a date at which such storage devices were designated as defective). At 318, the method ends.

Figure 4:
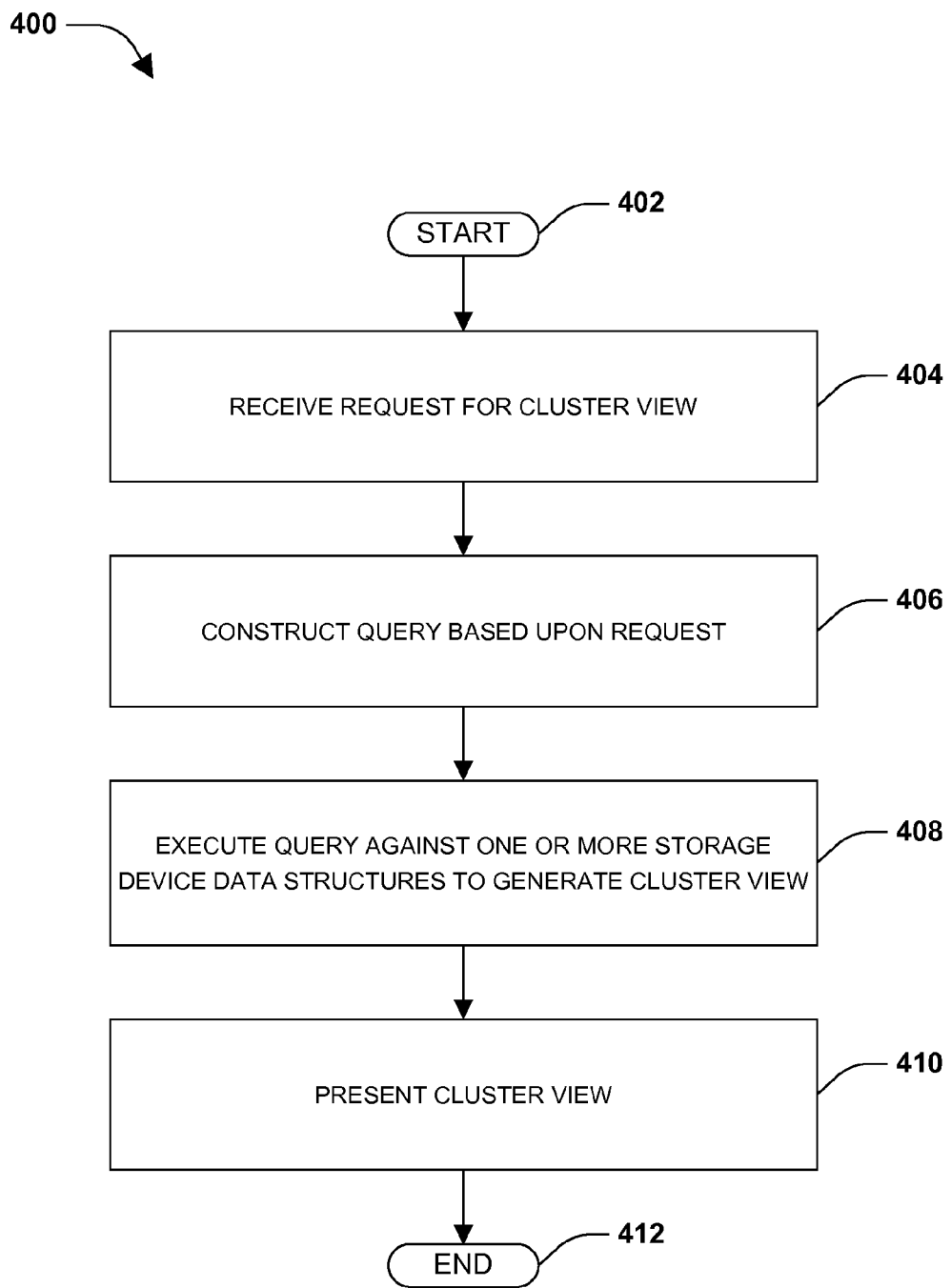
FIG. 4 is a flow chart illustrating an exemplary method of presenting a cluster view of one or more storage devices.

One embodiment of presenting a cluster view of one or more storage devices is illustrated by an exemplary method 400 in FIG. 4. At 402, the method starts. At 404, a request for a cluster view associated with one or more storage devices within a node cluster may be received. The request may correspond to an error cluster view, a storage device cluster view of a storage device, a node summary cluster view, and/or a wide variety of other views associated with storage information from the viewpoint of the node cluster. At 406, a query may be constructed based upon the request. It may be appreciated that in one example, the query may be similar to a relational database query that allows a plethora of different queries to be constructed (e.g., a first query that returns information regarding storage devices with high disk speed, a second query that returns information regarding inactive storage devices with errors, etc.). In one example, an error query may be constructed to search storage device data structures for storage devices associated with errors. In another example, a storage device cluster view query may be constructed to extract storage device information from a storage device data structure corresponding to the storage device. In another example, a node summary cluster view query may be constructed to extract storage device information from one or more storage device data structures based upon various criteria (e.g., a first query that returns information regarding storage devices with a high latency, a second query that returns information regarding storage devices that have I/O operations above a threshold value).

At 410, the cluster view may be presented. In one example, the cluster view may be presented within a command line interface. In one example, the cluster view may be presented within a user interface, such as a storage administration utility application. Because of the flexibility provided by executing custom constructed queries, a user may filter the cluster view. For example, a filter criterion may be received (e.g., a user may desire to filter a node summary cluster view to storage devices with a status of inactive). The query may be reconstructed based upon the filter criterion. The reconstructed query may be executed against one or more storage device data structures to generate a new cluster view. The new cluster view may be presented (e.g., the new cluster view may comprise the original results within the cluster view filtered by storage devices with a status of inactive). At 412, the method ends.

Figure 5:
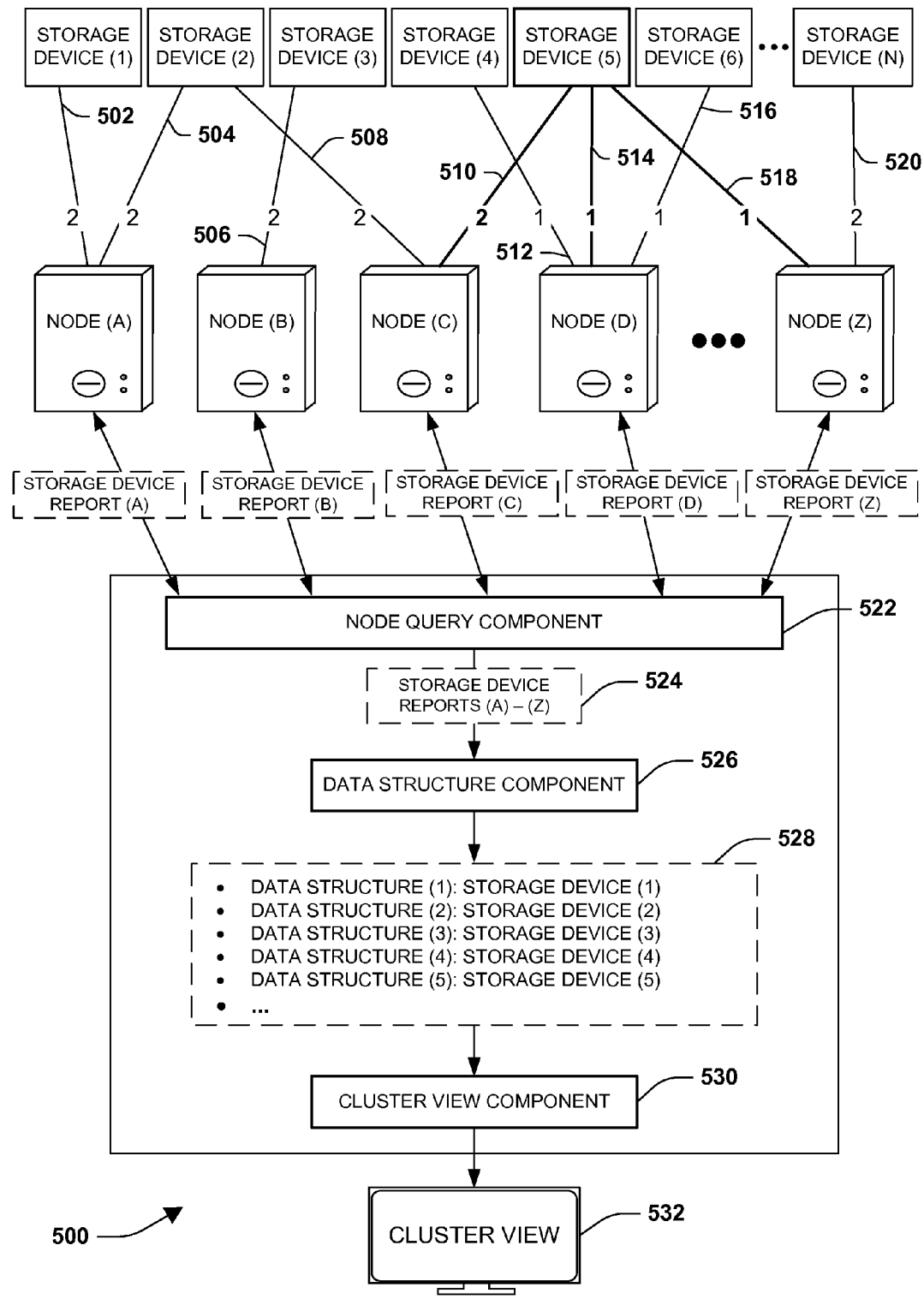
FIG. 5 is a component block diagram illustrating an exemplary system for generating a cluster view of one or more storage devices.

FIG. 5 illustrates an example of a system 500 configured to generate a cluster view 532 of one or more storage devices. System 500 may comprise a node query component 522, a data structure component 526, and/or a cluster view component 530. The node query component 522 may be configured to query storage application programming interfaces (APIs) on nodes within a node cluster for storage device reports associated with one or more storage devices connected to the respective nodes. In one example, the node cluster may comprise node (A), node (B), node (C), node (D), node (Z), and/or other nodes not illustrated. A node within the node cluster may be configured to manage data stored on one or more storage devices connected to the node (e.g., a node may provide a host computing device with read/write access to a storage device). For example, node (A) may comprise two path connections 502 to storage device (1) and two path connections 504 to storage device (2), and thus may manage storage operations associated with storage device (1) and (2). Node (B) may comprise two path connections 506 to storage device (3), and thus may manage storage operations associated with storage device (3). Node (C) may comprise two path connections 508 to storage device (2) and two path connections 510 to storage device (5), where node (C) may manage storage operations associated with storage device (2) and (5) and/or may be an ownership node of storage device (5). Node (D) may comprise a single path connection 512 to storage device (4), a single path connection 514 to storage device (5), and a single path connection 516 to storage device (6), and thus may manage storage operations associated with storage device (4), (5), and (6). Node (Z) may comprise a single path connection 518 to storage device (5) and two path connections 520 to storage device (N), and thus may manage storage operations associated with storage device (5) and (N). In this way, storage devices within the node cluster may be connected to one or more nodes that may be configured to manage data stored on such storage devices. It may be appreciated that in one example, a node may comprise two or more path connections to a storage device for redundancy considerations in the event a path connection fails.

The node query component 522 may query nodes (A)-(Z), for example in parallel, for storage device reports. It may be appreciated that one example of one or more storage device reports is shown and further described in FIG. 6. For example, node query component 522 may receive a storage device report (A) from node (A) comprising storage device information associated with storage device (1) and (2), a storage device report (B) from node (B) comprising storage device information associated with storage device (3), a storage device report (C) from node (C) comprising storage device information associated with storage device (2) and (5), a storage device report (D) from node (D) comprising storage device information associated with storage device (4)-(6), and a storage device report (Z) from node (Z) comprising storage device information associated with storage device (5) and (N). In this way, the node query component 522 may receive storage device reports (A)-(Z) 524.

The data structure component 526 may be configured to aggregate the storage device reports (A)-(Z) 524 to create storage device data structures 528 for respective storage devices. It may be appreciated that one example of a storage device data structure is shown and further described in FIG. 7. In particular, the data structure component 526 may identify a storage device within a storage device report (e.g., storage device (2) may be identified within storage device report (A) (and within storage device report (C) in the illustrated example)). A storage device data structure for the storage device may be defined based upon storage device information within the storage device report (e.g., a storage device data structure (2) for storage device (2) may be populated with storage device information corresponding to I/O operations between node (A) and storage device (2), latency between node (A) and storage device (2), serial number of storage device (2), etc.). If the storage device data structure is already created, then supplemental information may be added into the storage device data structure, non-supplemental redundant information may be discarded, and/or conflicting information may be discarded or used to overwrite current information based upon the role or preference of the node reporting such conflicting information (e.g., storage device information for storage device (2) reported by node (C) within storage device report (C) may be aggregated into the storage device data structure (2), which may already comprise storage device information populated from storage device report (A)). In one example, the data structure component may be configured to maintain one or more storage device data structures in an ordered sequence, where a storage device data structure represents an aggregate cluster view of a storage device, for example. Maintaining storage device data structures in an ordered sequence may allow for queries to be constructed and/or executed against one or more storage device data structures to retrieve storage device information that may be used to generate a cluster view.

The cluster view component 530 may be configured to generate the cluster view 532 utilizing one or more of the storage device data structures 528. In one example, the cluster view component 530 may query one or more storage device data structures to identify one or more storage devices associated with at least one error to create an error cluster view (e.g., the error cluster view may indicate that storage device (4) has a redundancy error along single path 512, storage device (5) has redundancy errors along one or more of the two path connections 510 and along single paths 514 and 518, and storage device (6) has a redundancy error along single path 516). In another example, the cluster view component 530 may query one or more storage device data structures to create a node summary cluster view comprising a cluster view of storage devices and storage device connectivity within the node cluster (e.g., the node summary cluster view may provide storage device information for storage device (1), (2), and (3) because such storage devices match a filter criterion "status=active and I/O operations>120"). In another example, the cluster view component 530 may query a storage device data structure associated with a storage device to create a storage device cluster view comprising path connections of the storage device, storage device configuration and statistical information for the storage device, error history for the storage device, and/or other information (e.g., a storage device cluster view for storage device (5) may describe path connections 510, 514, and 518, along with configuration and statistical information for storage device (5)). It may be appreciated that a variety of other cluster views may be generated, such as a cluster view specifying defective storage devices and/or a cluster view specifying one or more hot spare storage devices (e.g., storage device(s) ready to take-over in the event of a failure with little to no start up and or lag time).

Figure 6:
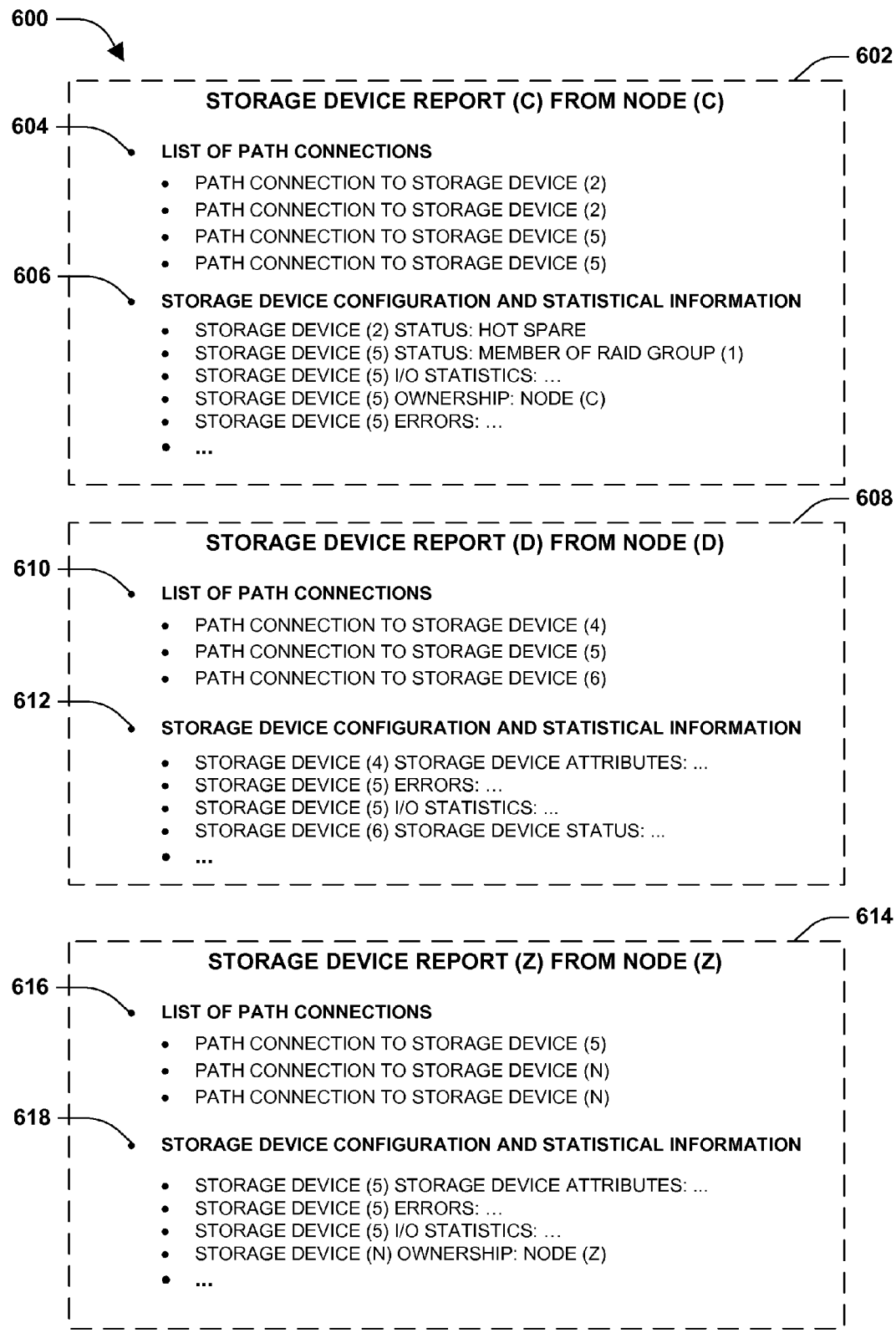
FIG. 6 is an illustration of an example of one or more storage device reports.

FIG. 6 illustrates an example 600 of one or more storage device reports. It may be appreciated that storage device report (C) 602 from node (C), storage device report (D) 608 from node (D), and/or storage device report (Z) 614 from node (Z) may illustrate examples of storage device reports that may be reported from node (C), node (D), and node (Z) in the node cluster illustrated in FIG. 5. In one example, a node query component may have sent a query request to node (C), node (D), node (Z), and/or other nodes within the node cluster for storage device reports. A storage API on node (C) may have gathered storage device information associated with storage device (2) and storage device (5), with which node (C) is connected. For example, the storage API may invoke one or more subsystems to gather a list of path connections 604 (e.g., information associated with wires (and/or wireless connections) connecting storage device (2) and (5) to one or more nodes, such as latency along the wire) and/or storage device configuration and statistical information 606 (e.g., device status, I/O statistics, ownership, errors, etc.). In this way, node (C) may provide the storage device report (C) 602 for aggregation by a data structure component.

Similarly, node (D) may generate storage device report (D) 608 comprising a list of path connections 610 and/or storage device configuration and statistical information 612 associated with storage device (4), (5), and (6), with which node (D) is connected. Node (Z) may generate storage device report (Z) 614 comprising a list of path connection 616 and/or storage device configuration and statistical information 618 associated with storage device (5) and (N), with which node (Z) is connected. In this way, a data structure component may aggregate the storage device reports (C), (D), and (Z) to create one or more data structures (e.g., a data structure for storage device (2), a data structure for storage device (4), a data structure for storage device (5), etc.). During aggregation, if storage device information associated with storage device (5) conflicts, then it may be appreciated that storage device information from node (C) within storage device report (C) 602 may be preferred because node (C) is an ownership node of storage device (5) (e.g., storage device configuration and statistical information 606 specifies that node (C) is an ownership node of storage device (5)). It may be appreciated that one example of a data structure (5) for storage device (5) is shown and further described in FIG. 7.

Figure 7:
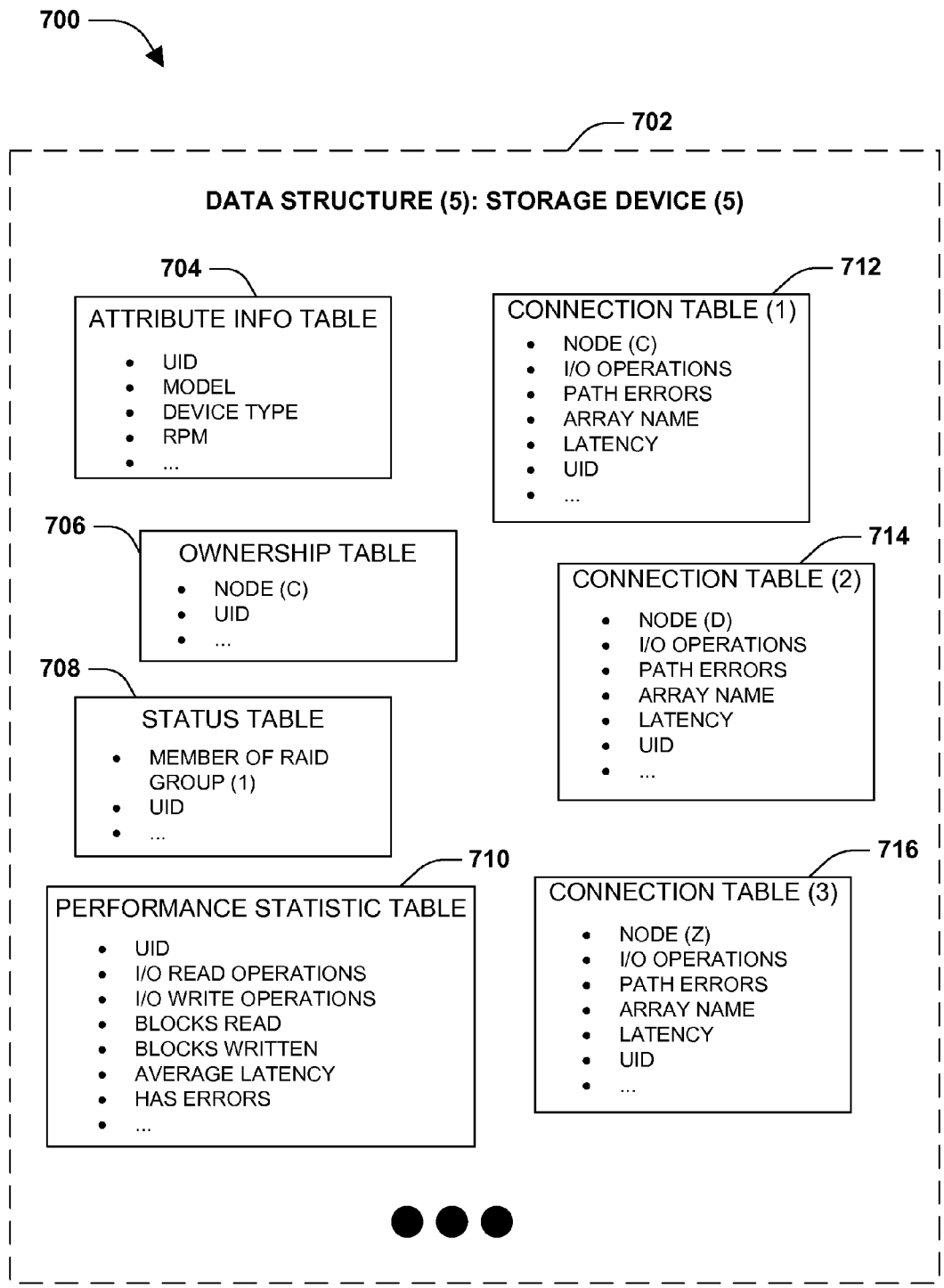
FIG. 7 is an illustration of an example of a data structure for a storage device.

FIG. 7 illustrates an example 700 of a data structure for a storage device. One or more storage device reports (e.g., storage device reports (C), (D), and (Z) of FIG. 6) may be aggregated together to define data structure (5) 702 for storage device (5). Data structure (5) 702 may comprise an attribute info table 704, an ownership table 706, a performance statistics table 710, one or more connection tables (e.g., connection table (1) 712 associated with a path connection from storage device (5) to node (C), connection table (2) 714 associated with a path connection from storage device (5) to node (D), and a connection table (3) associated with a path connection from storage device (5) to node (Z)), and/or other tables. During aggregation, if storage device information associated with storage device (5) conflicts, then it may be appreciated that storage device information from node (C) may be preferred because node (C) is an ownership node of storage device (5). For example, node (C) may be an ownership node that may perform a substantial percentage of I/O operations with regard to storage device (5), whereas node (D) may be a backup node that does not perform I/O operations with regard to storage device (5) until a failure of node (C) occurs. Thus, I/O operation data from node (C) may be preferred over I/O operation data from node (D). In this way, various storage device reports may be aggregated to populate data structure (5), where some data may be added, some data may be discarded, and/or some data may be used to overwrite other data.

Figure 8:
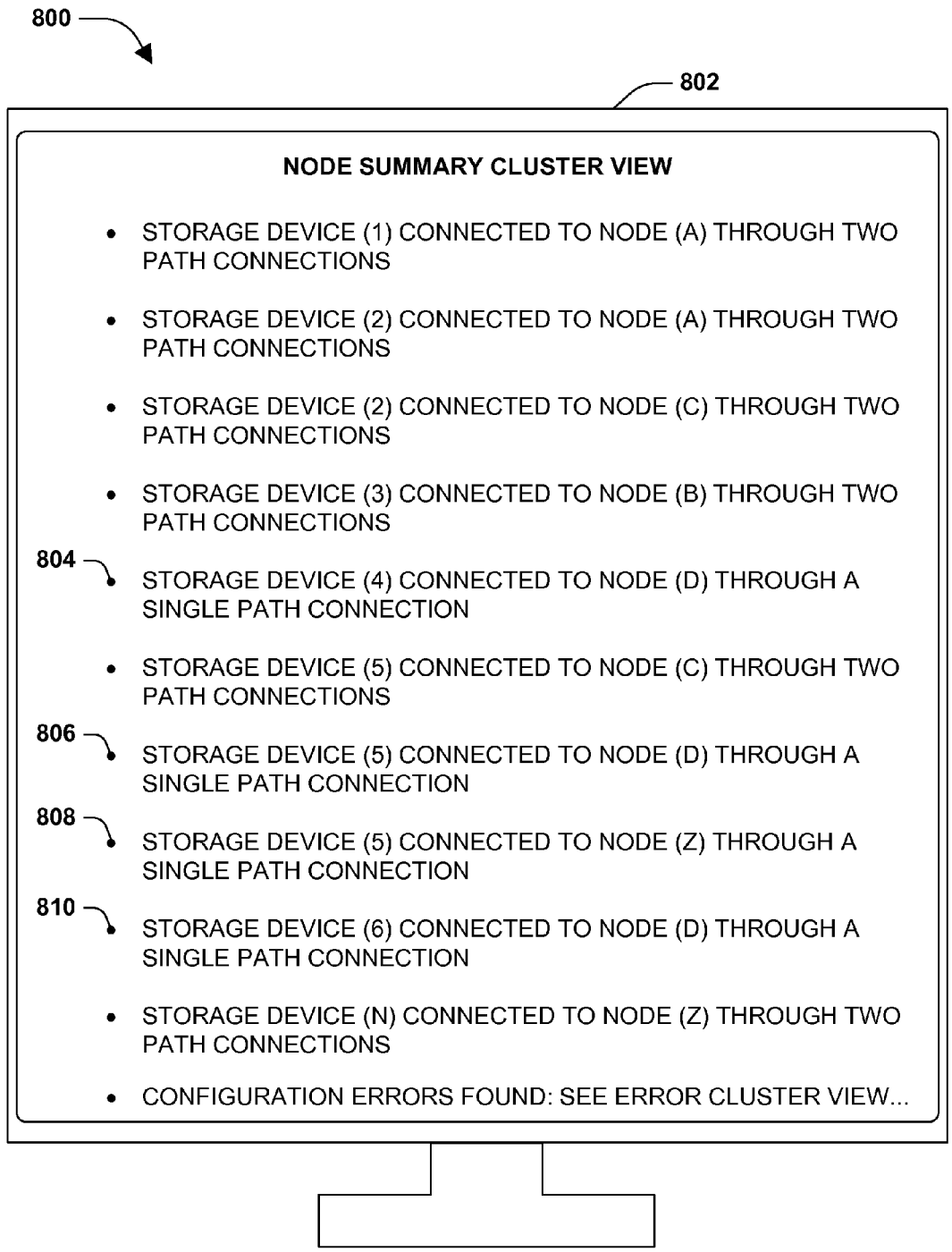
FIG. 8 is an illustration of an example of a node summary cluster view.

FIG. 8 illustrates an example 800 of a node summary cluster view 802. The node summary cluster view 802 may provide a variety of storage device information based upon various filter criteria that may be used to construct different queries (e.g., a plethora of node summary cluster views with different storage device information may be generated from different queries). The node summary cluster view 802 may be generated based upon querying one or more storage device data structures using a query string constructed from one or more filter criteria (e.g., "find storage devices where within performance statistics table I/O operations>100 and error count>2"; "find storage devices where within attribute info table RPM>7200 and within raid table RAID group=0"; "find storage devices assigned for node B"; "find storage devices with status=hot spare"; and/or a plethora of other queries may be used to generate the node summary cluster view 802). In one example, the node summary cluster view 802 may provide path connection data for storage devices (e.g., information regarding wires (and/or wireless connections) connecting a storage device to a node, such as latency, wire type, etc.). In this way, configuration errors may be identified. For example, if a redundancy policy is in place where a storage device is to be connected to a node with at least two path connections, then single path connections may be flagged as potential configuration errors (e.g., single path connections 804, 806, 808, and 810).

In another example, the node summary cluster view 802 may provide storage device information for storage devices associated with I/O operations above a predetermined threshold that have an error count above 2 (e.g., "find storage devices where within performance statistics table I/O operations>100 and error count>2"). In this way, the node summary cluster view 802 may provide storage device information associated with frequently access storage devices that have errors. It may be appreciated that the node summary cluster view 802 may be filtered to provide more granular results. For example, the node summary cluster view 802 of frequently accessed storage devices that have errors may additionally be filtered based upon storage devices connected to at least 4 nodes (e.g., "find storage devices where within performance statistics table I/O operations>100 and error count>2 and connection table count>4"). Thus, the original query may be restructured, and executed against one or more storage device data structures to determine a new node summary cluster view.

Figure 9:
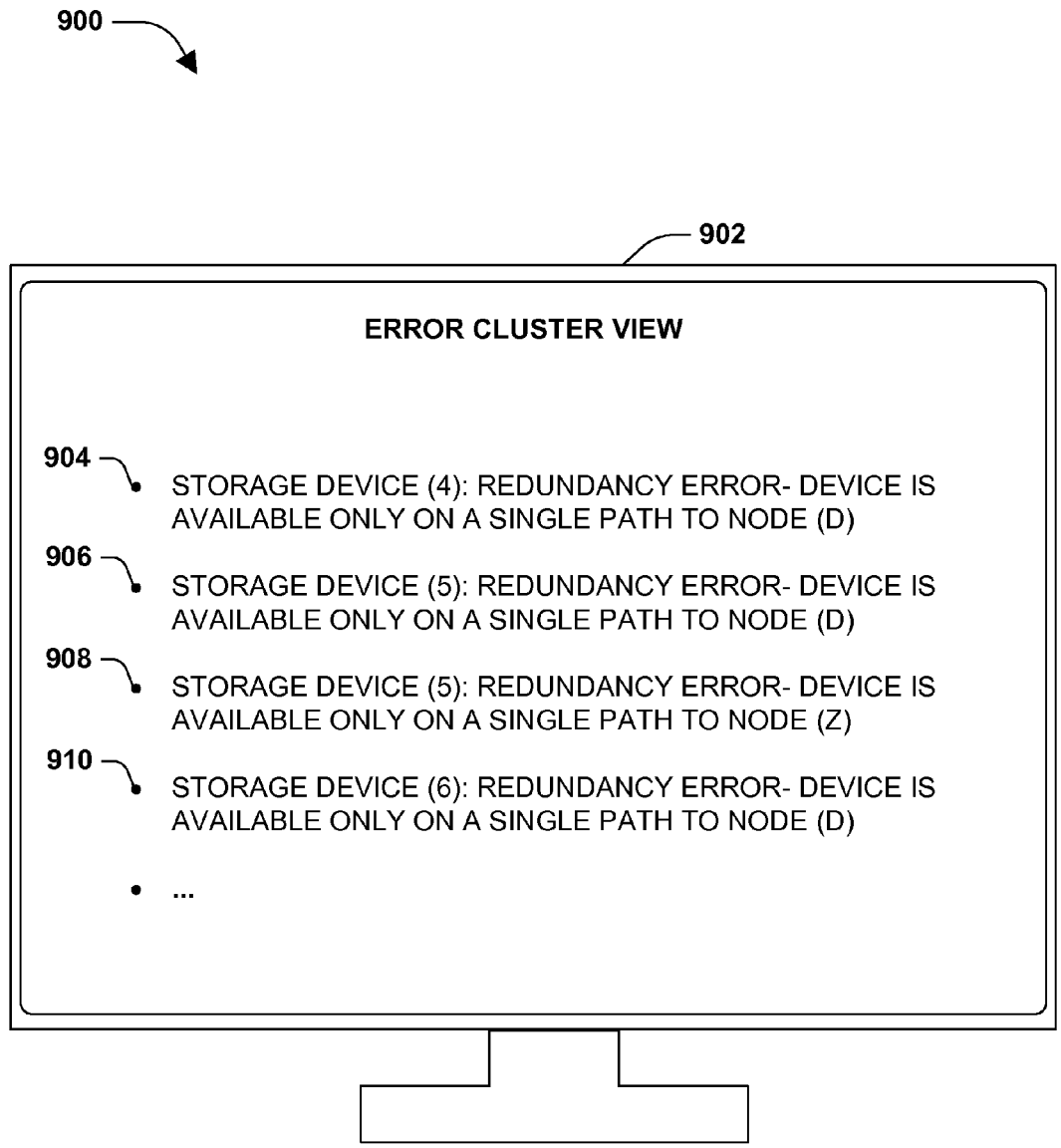
FIG. 9 is an illustration of an example of an error cluster view.

FIG. 9 illustrates an example 900 of an error cluster view 902. The error cluster view 902 may provide various error information, such as disk error information, I/O operation failures, connection failures, failure to meet a redundancy policy, etc. For example, error cluster view 902 may indicate that a redundancy policy (e.g., a redundancy policy that is not met unless at least two path connections connect a storage device and a node) is violated by one or more storage devices because 904 storage device (4) is connected to node (D) through a single path connection, 906 storage device (5) is connected to node (D) through a single path connection, 908 storage device (5) is connected to node (Z) through a single path connection, and 910 storage device (6) is connected to node (D) through a single path connection (e.g., path connections 512, 514, 516, and 518 of FIG. 5). The error cluster view 902 may have been generated utilizing one or more storage device data structures. For example, storage device data structures may have been queried to identify storage devices associated with errors (e.g., "find storage devices where within connection table path errors>0").

Figure 10:
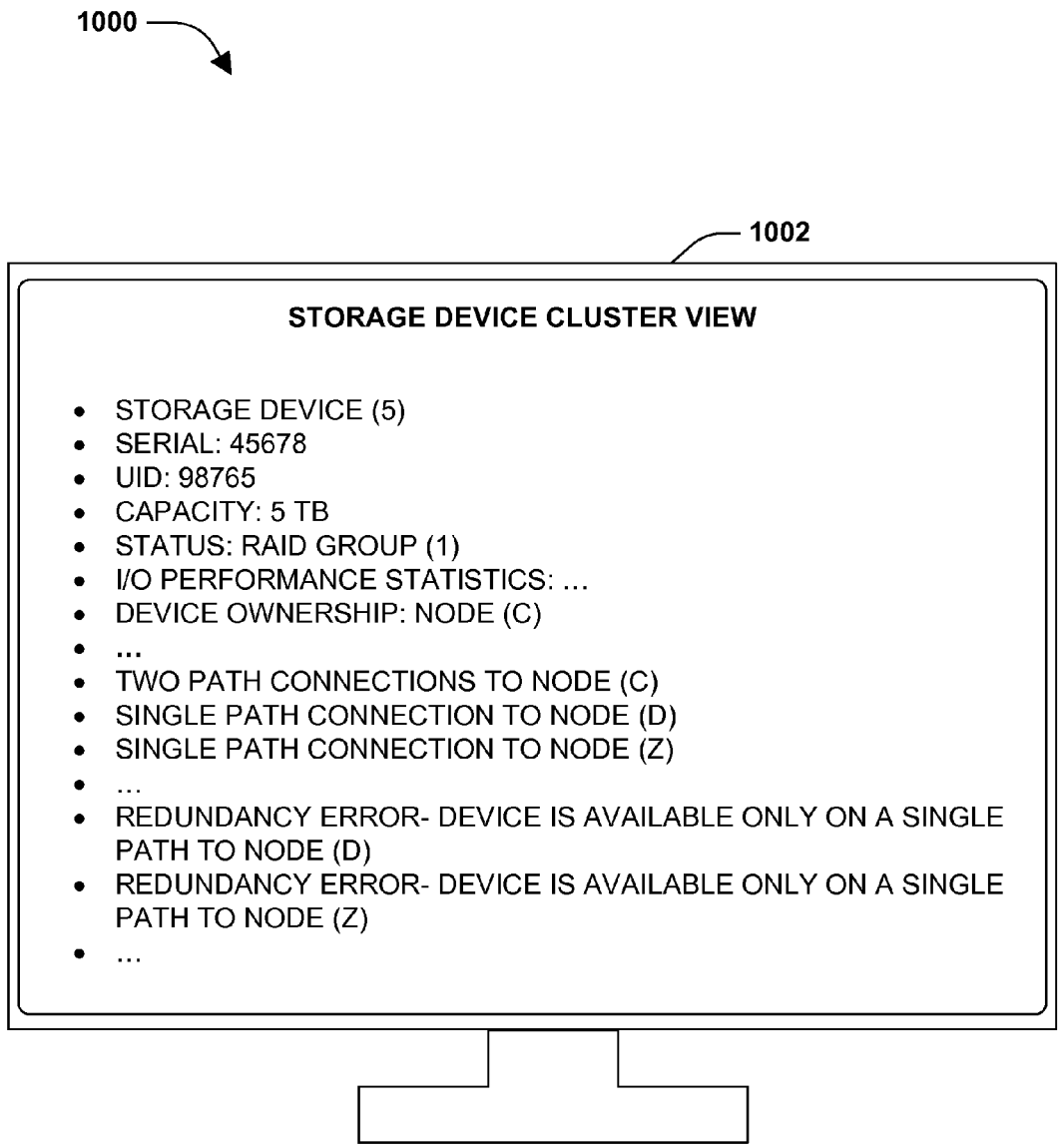
FIG. 10 is an illustration of an example of a storage device cluster view.

FIG. 10 illustrates an example 1000 of a storage device cluster view 1002. The storage device cluster view 1002 may provide storage device information for storage device (5). For example, a storage device data structure for storage device (5) may be queried (e.g., one or more tables within data structure (5) 702 of FIG. 7 may be queried) for storage device information. In this way, storage device cluster view 1002 may be populated with storage device information, such as serial number, capacity, I/O performance statistics, path connection, errors, and a variety of other information).

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Figure 11:
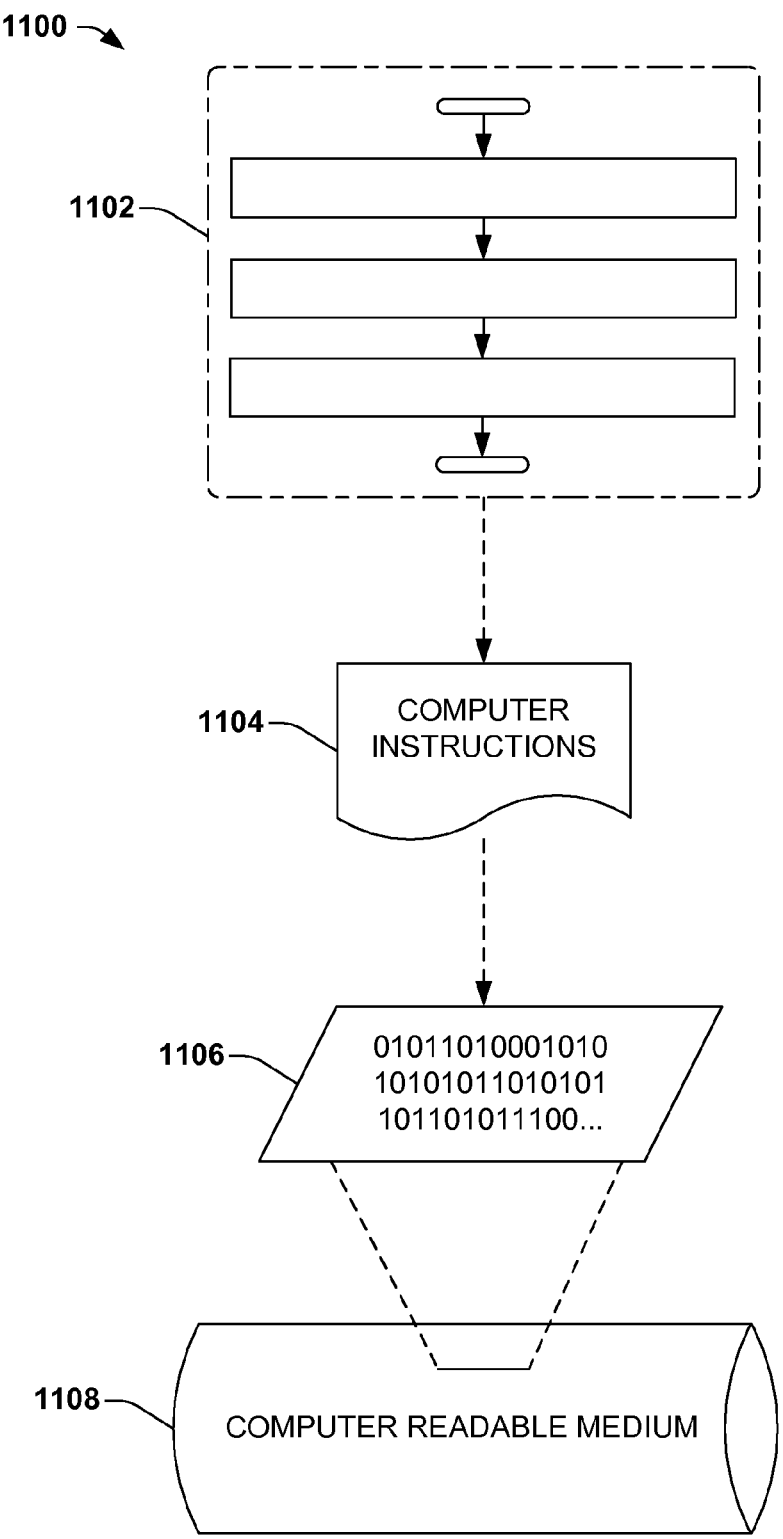
FIG. 11 is an example of a computer readable medium in accordance with one or more of the provisions set forth herein.

Another embodiment (which may include one or more of the variations described above) involves a computer-readable medium comprising processor-executable instructions configured to apply one or more of the techniques presented herein. An exemplary computer-readable medium that may be devised in these ways is illustrated in FIG. 11, where the implementation 1100 comprises a computer-readable medium 1108 (e.g., a CD-R, DVD-R, platter of a hard disk drive, flash drive, etc.), on which is encoded computer-readable data 1106. This computer-readable data 1106 in turn comprises a set of computer instructions 1104 configured to operate according to the principles set forth herein. In one such embodiment, the processor-executable instructions 1104 may be configured to perform a method 1102, such as at least some of the method 300 of FIG. 3 and/or method 400 of FIG. 4, for example, and/or at least some of a system, such as at least some of the system 500 of FIG. 5, for example. Many such computer-readable media may be devised by those of ordinary skill in the art that are configured to operate in accordance with the techniques presented herein.

Although the disclosure has been shown and described with respect to one or more implementations, equivalent alterations and modifications will occur to others skilled in the art based upon a reading and understanding of this specification and the annexed drawings. The disclosure is intended to include such modifications and alterations. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. Furthermore, to the extent that the terms "includes", "having", "has", "with", or variants thereof are used in either the detailed description or the claims, such terms are intended to be inclusive in a manner similar to the term "comprising." Also, "exemplary" means an example, not the best; "or" is intended to be inclusive not exclusive; "a" and/or "an" mean "one or more" unless specified otherwise and/or clear from context to be directed to a singular form; and at least one of A and B and/or the like generally means A or B or both A and B.

What is claimed is:

1. A method for providing a cluster view for one or more storage devices, comprising:
   receiving a request for a cluster view of a node cluster, the node cluster comprising a set of nodes configured to manage storage devices;
   constructing a query based upon the request;
   executing the query against a set of storage device data structures to obtain a storage device information result, the set of storage device data structures comprising storage device information derived from storage reports queried from the set of nodes;
   constructing a cluster view based upon the storage device information result;
   presenting the cluster view;
   receiving a filter criterion for filtering the cluster view;
   reconstructing the query based upon the filter criterion to create a reconstructed query;
   executing the reconstructed query against one or more storage device data structures to generate a new cluster view; and
   presenting the new cluster view.

2. The method of claim 1, the constructing a cluster view comprising:
   constructing a summary cluster view as the cluster view, the summary cluster view comprising a first device to node connection summary and a second device to node connection summary.

3. The method of claim 2, the first device to node connection summary corresponding to a first storage device and a first node, the second device to node connection summary corresponding to a second storage device and the first node.

4. The method of claim 2, the first device to node connection summary corresponding to a first storage device and a first node, the second device to node connection summary corresponding to a second storage device and a second node.

5. The method of claim 2, the first device to node connection summary corresponding to a first storage device and a first node, the second device to node connection summary corresponding to the first storage device and a second node.

6. The method of claim 1, the constructing a cluster view comprising:
   constructing an error cluster view as the cluster view, the error cluster view comprising an error associated with a first storage device.

7. The method of claim 6, the error comprising a redundancy error specifying that the first storage device is connected to a first node according to a single path configuration and not a redundant path configuration.

8. The method of claim 1, the constructing a cluster view comprising:
   constructing a storage device cluster view as the cluster view, the storage device cluster view comprising at least one of a path connection from a first storage device to one or more nodes, storage device configuration information for the first storage device, storage device statistical information for the first storage device, or an error history for the first storage device.

9. The method of claim 1, the constructing a cluster view comprising:
   constructing a storage device summary cluster view as the cluster view, the storage device summary cluster view comprising a cluster view of storage devices and storage device connectivity within the node cluster.

10. The method of claim 9, the constructing a storage device summary cluster view comprising:
    obtaining a first storage device information result from a first storage data structure for a first storage device;
    obtaining a second storage device information result from a second storage data structure for a second storage device; and
    constructing the storage device summary cluster view based upon the first storage device information result and the second storage device information result.

11. The method of claim 1, the cluster view comprising first storage device attribute information for a first storage device managed by a first node and second attribute information for a second storage device managed by a second node.

12. The method of claim 1, the cluster view comprising first storage device performance statistics information for a first storage device managed by a first node and second storage device performance statistics information for a second storage device managed by a second node.

13. The method of claim 1, the cluster view comprising first storage device connection information for a first storage device managed by a first node and second storage device connection information for a second storage device managed by a second node.

14. The method of claim 1, the cluster view comprising first storage device ownership information for a first storage device managed by a first node and second storage device ownership information for a second storage device managed by a second node.

15. A computing device comprising:
    a memory containing machine readable medium comprising machine executable code having stored thereon instructions for performing a method of providing a cluster view for one or more storage devices; and
    a processor coupled to the memory, the processor configured to execute the machine executable code to cause the processor to:
      receive a request for a cluster view of a node cluster, the node cluster comprising a set of nodes configured to manage storage devices;
      construct a query based upon the request;
      execute the query against a set of storage device data structures to obtain a storage device information result, the set of storage device data structures comprising storage device information derived from storage reports queried from the set of nodes;
      construct a cluster view based upon the storage device information result;
      present the cluster view;
      receive a filter criterion for filtering the cluster view;
      reconstruct the query based upon the filter criterion to create a reconstructed query;
      execute the reconstructed query against one or more storage device data structures to generate a new cluster view; and
      present the new cluster view.

16. The computing device of claim 15, the cluster view comprising a summary cluster view, the summary cluster view comprising a first device to node connection summary and a second device to node connection summary.

17. The computing device of claim 15, the cluster view comprising an error cluster view, the error cluster view comprising an error associated with a first storage device.

18. The computing device of claim 15, the cluster view comprising a storage device cluster view, the storage device cluster view comprising at least one of a path connection from a first storage device to one or more nodes, storage device configuration information for the first storage device, storage device statistical information for the first storage device, or an error history for the first storage device.

19. The computing device of claim 15, the cluster view comprising a storage device summary cluster view, the storage device summary cluster view comprising a cluster view of storage devices and storage device connectivity within the node cluster.

20. A non-transitory computer readable medium comprising instructions which when executed perform a method for providing an error cluster view for one or more storage devices, comprising:
  receiving a request for a cluster view of a node cluster, the node cluster comprising a set of nodes configured to manage storage devices;
  constructing a query based upon the request;
  executing the query against a set of storage device data structures to obtain a storage device information result corresponding to storage devices associated with errors, the set of storage device data structures comprising storage device information derived from storage reports queried from the set of nodes;
  constructing an error cluster view, comprising storage device information related to the storage devices associated the errors, based upon the storage device information result, the error cluster view not comprising storage device information associated with storage devices not associated with the errors; and
  presenting the error cluster view.

* * * * *